United States Patent [19]
Doede

[11] Patent Number: 5,511,363
[45] Date of Patent: Apr. 30, 1996

[54] VERTICAL CYCLICALLY OPERATING FLAT SACK MACHINE

[75] Inventor: Klaus Doede, Verl, Germany

[73] Assignee: Klockner Hansel GmbH, Hanover, Germany

[21] Appl. No.: 230,159

[22] Filed: Apr. 19, 1994

[30] Foreign Application Priority Data

Apr. 22, 1993 [DE] Germany ............... 43 13 205.7

[51] Int. Cl.⁶ ............................................. B65B 9/06
[52] U.S. Cl. ................................. 53/552; 53/374.6
[58] Field of Search ............... 53/550, 551, 552, 53/553, 554, 451, 77, 374.5, 374.6; 83/563, 564, 954, 168; 156/515; 493/194, 193, 204, 267

[56] References Cited

U.S. PATENT DOCUMENTS

| | | | |
|---|---|---|---|
| 2,513,581 | 7/1950 | Moule | 18/19 |
| 3,462,796 | 1/1967 | Koch et al. | 83/564 |
| 4,541,223 | 9/1985 | Childers | 53/77 |
| 4,850,944 | 7/1989 | Osborn | 493/193 |
| 4,854,109 | 8/1989 | Pinarer et al. | 53/397 |

FOREIGN PATENT DOCUMENTS 0010018   9/1978   France .
930182    7/1959   United Kingdom .
1114447   7/1965   United Kingdom .

Primary Examiner—John Sipos
Assistant Examiner—Gene Kim
Attorney, Agent, or Firm—Hopkins & Thomas

[57] ABSTRACT

A vertical cyclically working flat sack machine (1) serves to package flowable or pourable materials or objects in flat sacks to be sealed, which are formed from two foils (6, 7) with a common vertical foil plane (9). On a machine frame (2) a measurer (3) with filling means (5), a deflector (8) for the two foils (6, 7), a sealer (15), a discharge device (29), and a longitudinal and transverse cutter (30, 31) are provided from top to bottom. The sealer (15) has two symmetrically fashioned units (16, 17), each comprising a pivot spar (18, 18'), a sealer spar support (20, 20'), a sealer spar (21, 21') with a sealer drive (34), a heating plate (23, 23'), a clamping plate (24, 24') and the sealing tools (25, 25', 26, 26') mounted thereupon. The units (16, 17) each are pivotable from a position running parallel to the foil plane (9), especially separated by the length of a sealing lift, about a pivot axis (19, 19') by approximately 90° into a fitting and cleaning position. The pivot axes (19, 19') for the units (16, 17) are arranged horizontally, and the sealing tools and the clamping plates (24, 24') are provided mainly above a horizontal plane connecting the pivot axes (19, 19').

12 Claims, 8 Drawing Sheets

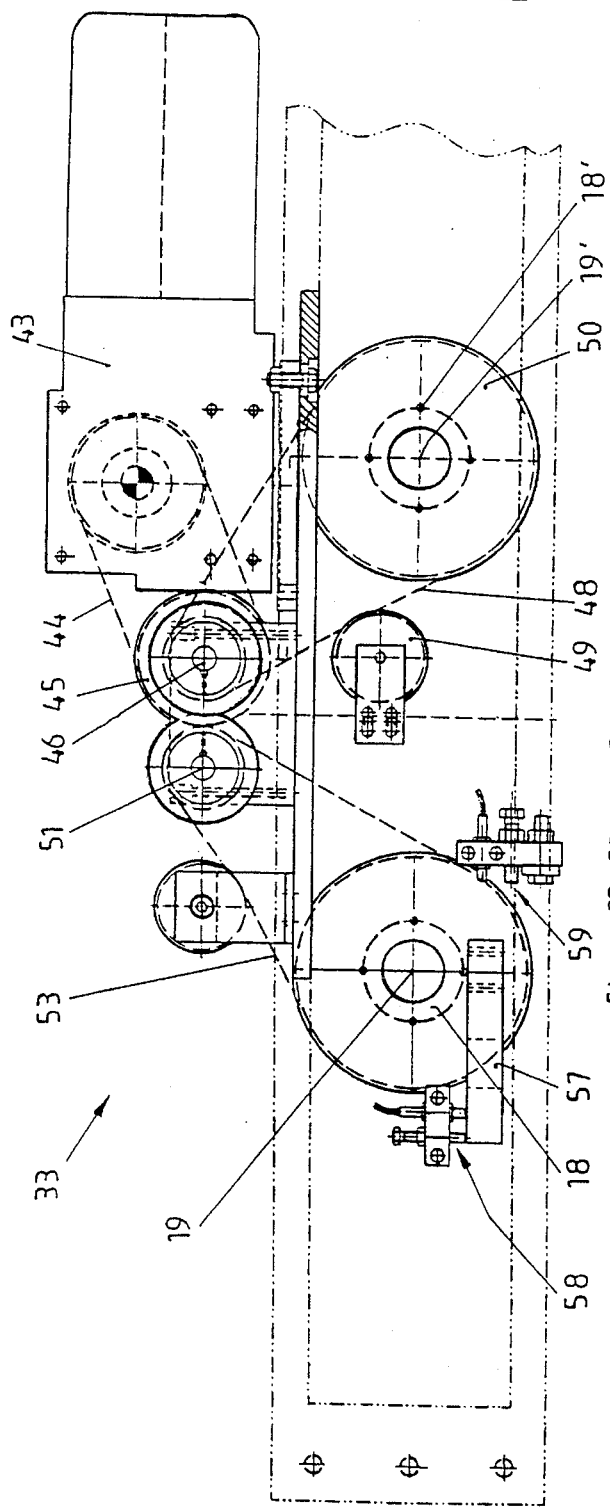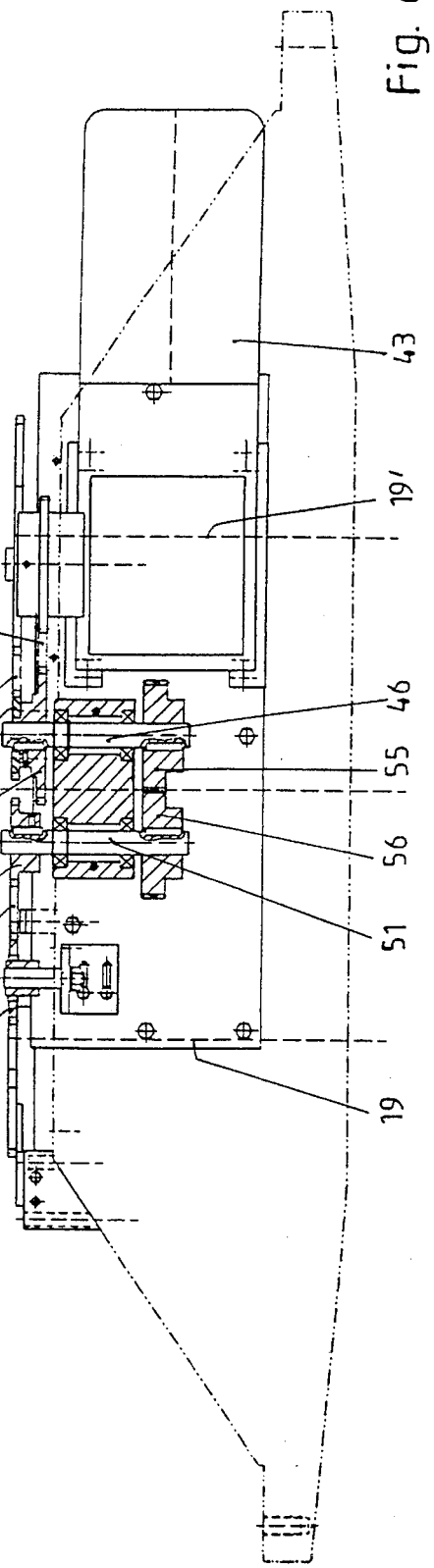

VERTICAL CYCLICALLY OPERATING FLAT SACK MACHINE

FIELD OF THE INVENTION

The invention relates to a vertical cyclically operating flat sack machine for packaging flowable or pourable materials or objects in flat sacks to be sealed, which are formed from two foils with a common vertical foil plane, with a machine frame, on which are provided from top to bottom a measurer with filling means, a deflector for the two foils, a sealer, a discharge device, and a longitudinal and transverse cutter, in which the sealer has two symmetrically fashioned units, each comprising a pivot spar, a sealer spar support, a sealer spar with a sealer drive, a heating plate, a clamping plate and the sealing tools mounted thereupon, and in which the units each are pivotable from a position running parallel to the foil plane, especially separated by the length of a sealing lift, about a pivot axis by approximately 90° into a fitting and cleaning position. Tubes serve as the filling means when liquids or pastes such as mustard, ketchup, tooth paste, and the like are packaged. Pourable products such as salt, pepper, powder or granular material for the production of drinks or the like are filled through funnels. But also solid products such as pills, capsules, bandaids or the like may be dispensed above the sealer by filling means accordingly modified.

BACKGROUND OF THE INVENTION

Vertical cyclicaly operating flat sack machines of the type described above are known. A distinguishing feature is that the foils move in a common vertical foil plane, at least through the sealer and neighboring stations. The foil plane extends vertically and in a right angle with respect to the machine frame of the flat sack machine, i.e. the operator standing in front of the flat sack machine looks in the direction of the foil plane and on a mainly vertically extending side on the machine frame. The individual aggregates and stations are mounted on the front of the machine frame. The sealer of such flat sack machines has the well known purpose to bond together by pressure and temperature two foils facing each other with their inner sides, thereby creating the flat sacks. The inner sides of the foils are provided with a sealing mass, especialy polyethylene. Usually multiple use is applied, i.e. a plurality of sacks are simultaneously filled, sealed, and treated in parallel. The width of the foils is used so that there is little waste, i.e. the longitudinal sealing tools, which operate along the edges of the foils, are adjusted so close to the edges that unavoidable residue of the sealing mass, which is pressed out from between the two foils under pressure, build up on them. This sealing mass builds up on the outer longitudinal sealing jaws. Residue of the sealing mass may also collect on the outer flat sacks, especially when such residue has build up on the outer longitudinal sealing jaws and the residue is torn off the outer flat sack and carried along. This poses not only the danger that the outer flat sacks have edges that are not pretty. If there is a larger build up of sealing mass, this may come into contact with the paper outer layer of the foil, which leads to the danger of the sack tearing during the cyclic movement of the flat sacks. This in turn leads to an interruption of the production in order to remove the refuse. Considerable cleaning of the flat sack machine and its aggregates becomes necessary.

In order to counteract the disadvantages and dangers described above, there is the possibility in known flat sack machines (e. g. the machine LA-3 according to the pamphlet "Flat sack machines" by the applicant) to liberate the two symmetrically fashioned units of the sealer from a locked operating position and to manually pivot the units by 90°. The pivoting takes place about vertical axes, so that the clamping plate with the sealing tools arranged thereupon moves relative to the two foils and the filling means. Since the filling means extend more or less into the sealer, and the longitudinal sealing tools are arranged parallel to the filling means, there is the danger the sealing tools touch the filling means, change their carefully adjusted relative position or even damage them during the manual pivoting of the units into the fitting and cleaning position. The danger of this happening is high because the longitudinal sealing tools and the filling means may overlap in a large region during the pivoting of the units about the vertical axes and therefore may touch during the pivoting. It should additionally be ascertained that the pivoting is done only from the separated position of the sealing tools. At the end of the interruption of the operation the units have to be pivoted back and locked into position manually. In the fitting and cleaning position the sealing tools may also be cleaned from adhering sealing mass, which is usually performed using a brush. When setting the flat sack machine to a different product or a different format the sealing tools have to be changed, which is also possible only in the fitting and cleaning position. The sealing tools are arranged vertically above each other also in the fitting and cleaning position, so that during the removal and fitting of the sealing tools it is necessary to support these in their respective positions. The change thus becomes elaborate and time consuming.

All the products being packaged are also subjected to the temperature of the sealer while in its vicinity. The sealing tools may have temperatures of up to 180° C. Especially pharmaceutical and cosmetic products may be adversely affected by excessive heat, which can already be the case during a short interruption of the production process, when the units of the sealer are not manually pivoted into the fitting and cleaning position during such an interruption of the operation. Due to the other already described dangers, especially the damaging of the filling means, the elaborate manual pivoting into the fitting and cleaning position is sometimes not performed, though. Such an often recurring short interruption of the operation is for instance given during the changing of the rolls of foil. During interruptions of the operation, in which the pivoting of the units into the fitting and cleaning position is not performed, there is the further danger that the inner side of the foil adheres to the product guiding filling means. This leads to a tearing of the foil upon restarting the flat sack machine.

In the known flat sack machines it is naturally attempted to process foils as wide as possible, i.e. to simultaneously form a plurality of flat sacks in parallel. This necessitates that the sealing tools extend rearwards toward the machine frame relative to a vertical plane connecting the two vertical pivot axes, though. During the pivoting of the units the rear part of the sealing tools approaches the foil and the filling means due to the geometric circumstances, i.e. it comes closer to the foil and the filling means during this pivoting, so that the danger of bending, pushing, and changing the setting of the relative position of the filling means is especially great. This danger is the greater the larger the usable width is. This just described region of danger extends over the whole height of the sealing tools.

There are also vertically operating flat sack machines known, in which the arrangement is such that the plane of the foils is parallel to the casing wall of the machine frame, so that the operating personnel .standing in front of the flat sack machine looks upon the plane of the foils. The sealing tools are then arranged with their one unit in front of the plane of the foils and with their other unit behind the plane of the foils. The unit provided in front of the plane of the foils is then removable, in order to be able to perform fitting and cleaning procedures. The unit located behind the plane of the foils is only accessible by removing both foils, though, which necessitates an especially elaborate rethreading of the foils before the restarting of the machine.

From the U.S. Pat. No. 4,854,109 it is per se known for machines, which seal materials between two foils, to pivot away parts to be removed temporarily from the foil by pivoting these about horizontally projecting axes, which are mainly in the lower region of the parts to be pivoted. The sealing tools are not affected by this, though. They are arranged on a sled, with the aid of which they are translatable in a direction perpendicular to the plane of the foils.

SUMMARY OF THE INVENTION

The invention is based on the problems described above. It is the object of the invention to exclude the danger of damaging the filling means during the pivoting of the units into a fitting and cleaning position for a flat sack machine of the type described above, to make the changing of the sealing tools easier, and to provide an incentive to pivot the units into the fitting and cleaning position even during a short interruption of the production process.

According to the invention this is achieved by the pivot axes for the units being arranged horizontally, and the sealing tools and the clamping plates being provided mainly above a horizontal plane connecting the pivot axes. This concerns especially the longitudinal sealing tools, but it may relate only to major regions of the logitudinal sealing tools or on the other hand also to the transverse sealing tools.

By the relative arrangement of the pivot axes, about which the units are pivotable into the fitting and cleaning position, a different geometry of movement especially of the longitudinal sealing tools and the clamping plate is attained relative to the plane of the foils. While in the state of the art especially the upper ends of the longitudinal sealing tools performed a tangential movement with respect to the plane of the foils, especially the upper ends of the longitudinal sealing tools are pivoted perpendicularly away from the plane of the foils at the beginning of a pivoting movement. The longitudinal sealing tools therefore have no possibility to come into contact with the filling means. The respective longitudinal sealing tools are now pivoted in planes in which the filling means are not arranged. The invention therefore utilizes the advantage resulting from the separation of the two foils to each other at the place of arrangement of the filling means with respect to the thickness of the foils. In the new relative arrangement of the units the width of the foils is of no importance anymore; it becomes possible to process foils wider than in the state of the art. In the pivoting-apart movement of the units, at most sealing tools provided in the lower region of the clamping plate or plates perform a tangential initial movement with respect to the plane of the foils. This occurs in a region, though, which is usually located far below the free ends of the filling means, i.e. where the sealing tools cannot come into contact with the filling means anyhow.

It is further advantageous that the changing of the tools and the cleaning are considerably easier to perform. This is due to the fact that the sealing tools are in a horizontally aligned position in the fitting and cleaning position, i. e. in a position in which they do not have to be manually supported. The clamping plate, which may also consist of a number of individual parts, may easily be exchanged with the sealing tools mounted thereupon. In the fitting and cleaning position the flat sack machine does not need more space, since the units are pivoted in a plane parallel to the machine frame. Insofar the operating personnel is also endangered to a lesser degree. In the fitting and cleaning position the sealing tools radiate their heat upwards and do not endanger the region of the foils and the filling means with the products. Also the adheasion of the foil to product guiding parts is done away with. The products are not subjected to elevated temperatures anymore during interruptions of the production process and therefore not affected adversely.

It is especially advantageous if a motor drive is provided for pivoting the two units into and out of the fitting and cleaning position. The elaborate manual pivoting then becomes unneccessary, and the possibility to attain the fitting and cleaning position also for every short interruption of the production process is created. Insofar, an incentive is also created for the operating personnel to manually clean especially the outer longitudinal sealing tools more often, which favorably influences the operating safety.

The motor drive may be provided with a control unit, which triggers the fitting and cleaning position at every interruption of the production process. The control unit is especially fashioned, so that the control unit brings the units into the separated position and immobilizes them there at the initiation of an interruption of the production process. From this separated position the fitting and cleaning position is then taken in. At the end of the interruption of the production process, i.e. when restarting the machine, the units are first pivoted to the separated position. After a corresponding motorized locking the production is restarted.

Also the transverse sealing tools may be arranged on the clamping plate above the horizontal plane connecting the pivot axes. Then all sealing tools are located above said horizontal plane, where in turn the longitudinal sealing tools are arranged above the transverse sealing tools. The transverse sealing tools may extend transversely with respect to the filling means, but relatively far below the free ends of the filling means, so that there is no danger of damaging these during the pivoting. The longitudinal sealing tools on the one hand and the transverse sealing tools on the other hand may be arranged on separate clamping plates. It is also possible, though, that the transverse sealing tools are arranged slightly below the horizontal plane connecting the pivot axes. In this case it is advisable to move into the fitting and cleaning position only from the separated position. At the beginning of the pivoting the transverse sealing tools move somewhat towards the foils, without reaching or adversely affecting these, though.

Upon reaching the position separated by the sealing lift, feelers, especially limit switches, are provided, from the signals of which the control unit initiates the pivoting into the fitting and cleaning position. Then an unambiguous order of events is set, which works very safely.

The motor drive for pivoting the units may have a gear motor, two meshing gears, and one geared connection to the pivot spar of each unit. Through the gears the opposite directions of motion of the two units are forcibly coupled to each other. The following geared connection makes it unneccessary to arrange the gears with their axis on the pivot axis of the pivot spar. In this way a number of gear ratios may be created.

The pivot spar may be formed to be hollow and the sealer drive for the sealer spar may be led through the pivot spar of each unit. This has the advantage that the motor drive for the pivoting of the units and the sealer drive for the sealer spar of each unit do not adversely influence each other. It is especially not neccessary to decouple the the sealer drive for reaching the fitting and cleaning position. Admittedly, an actuation of the sealer drive is not planned during the pivoting of the units and in the fitting and cleaning position.

A thrust rod may be driven moving to and fro inside the pivot spar, to which a fork block is connected, and a knee lever drive for the deflection of the sealer drive to the sealer spar and consequently to the sealing tools may be provided in the sealer spar support, with the fork block acting on the knee lever drive. The use of a knee lever drive on the one hand has the advantage of directly deflecting the force by 90°, so that consequently the sealer lift may be transmitted by the sealing tools in the plane of the foils. On the other hand the knee lever drive allows also large forces to be sensitively adjustable, in which also the time constants typical for the sealing are conserved.

Each unit may be provided with a clamping device for quickly changing the clamping plate with the sealing tools arranged thereupon. For instance, an eccentric spanner maybe applied, in order to allow the loosening of the clamping plate with the longitudinal sealing tools arranged thereon in one motion. The clamping plate may have grooves, so that the clamping plate can be removed from the heating plate by sliding it along the grooves. A second clamping plate previously set up with different longitudinal sealing tools may in the same way be easily fitted, in which the heating plate is in a horizontal position in the fitting and cleaning position, so that the clamping plate is supported by the heating plate during the fitting. Through the use of an eccentric spanner the new clamping plate my be tightened easily and quickly, so that such a change of tools may be performed in a significantly shorter time than previously possible. It is advantageous to arrange the longitudinal sealing tools and the transverse sealing tools on separate clamping plates, first in order to create smaller units and second to avoid having to change the transverse sealing tools when only the longitudinal sealing tools need to be changed.

BRIEF DESCRIPTION OF THE DRAWINGS

The invention is further described and explained with the aid of a preferred embodiment. The drawings show.

DETAILED DESCRIPTION

Figure 1:
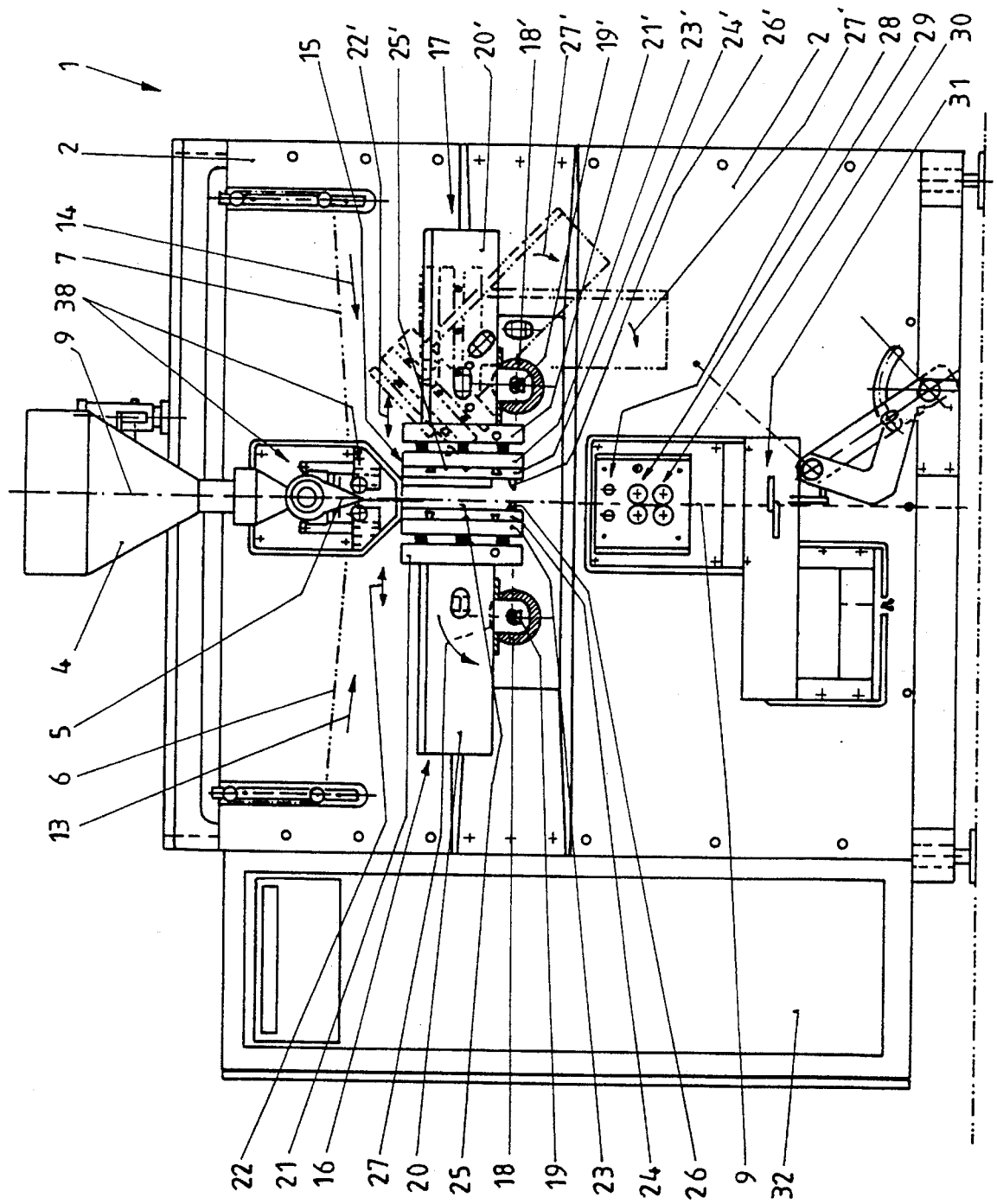
FIG. 1 a frontal view of the flat sack machine.

In FIG. 1 the flat sack machine 1 is shown as it presents itself to the operating personnel standing in front of the flat sack machine 1. The flat sack machine 1 has a machine frame 2, which presents itself mainly as a vertical wall lying in the drawing plane of FIG. 1. Mounted on the front of the machine frame 2 a measurer 3 extends from top to bottom, with a reservoir 4 for flowable or pourable products, which filling means 5 deposit between two foils 6 and 7, which are brought into a relative position to each other with their back sides by a deflector 8, including the filling means 5 extending downwards inbetween them. This happens in a vertical foil plane 9, i.e. in a vertical plane perpendicular to the plane of the drawing resp. perpendicular to the wall of the machine frame 2. The foil 6 is pulled off a roller 10 and the foil 7 off a roller 11 located on the back side of the flat sack machine 1 (FIG. 2), routed through a foil storer 12, and led separately above the machine frame 2 to the front, in which the foils 6 and 7 pass deflector rollers according to the arrows 13 and 14 into the deflector 8 and from there into the foil plane 9.

Located below the deflector 8 is a sealer 15, which is principally symmetric with respect to the foil plane 9 and is comprised mainly of two units 16 and 17. The unit 16 has a pivot spar 18, which is comprised of a tube-like body that is open on its top side, which extend around a pivot axis 19. The pivot spar 18 and the pivot axis 19 are arranged perpendicular with respect to the plane of the drawing, and therefore with respect to the vertical wall of the machine frame 2. The pivot axis 19 extends along the flat sack machine 1 in a horizontal direction parallel to the foil plane 9. A sealer spar support 20, which is fashioned in the shape of a box-like casing, is attached to the pivot spar 18. On the side facing the foil plane 9 a sealer spar 21 is provided, which is movable with respect to the fixed sealer spar support according to the double arrow 22, which represents the sealer lift of the unit 16. A heating plate 23, which in turn carries a clamping plate 24, to which longitudinal sealing tools 25 and transverse sealing tools 26 are connected, is connected to the sealer spar 21.

The left unit 16 and the right unit 17 are set up symmetric with respect to the foil plane 9. The corresponding individual parts of the right unit 17 are provided with a primed reference numeral. The unit 16 can be pivoted about its pivot axis 19 by approximately 90° in the direction of the arrow 27, while the unit 17 is pivotable about the pivot axis 19' according to the arrows 27' in an opposite sense of direction. The unit 16 is shown in the sealing position. i.e. with sealing tools 25, 26 pressed against the foil plane 9. The unit 17 is shown in the solid line in the separated position according to arrow 22'. In dashed and double dotted line two intermediate positions according to the arrows 27' are depicted, in order to examplify the pivoting of the unit 17 about its pivot axis 19' from the separated position into the fitting and cleaning position. It is understood that the two units 16 and 17 are always actuated in a symmetric fashion, in deviation to the drawing. The drawn depiction was chosen to examplify the different possibilities. In the fitting and cleaning position the sealer spar support 20' is in a mainly vertical position, while the sealer spar 21', the heating plate 23', the clamping plate 24', and the longitudinal sealing tools 25' as well as the transverse sealing tools 26' are in a mainly horizontal position.

A signing station 28, a discharge device 29, a longitudinal cutter 30, and a transverse cutter 31 are situated below the sealer 15.

The flat sack machine 1 has a control unit 32, which serves to control the different movements. A motor drive 33

(FIGS. 5 and 6) is provided for the simultaneous pivoting of the unit 16 about its pivot axis 19 on the one hand and the unit 17 about its pivot axis 19' on the other hand. The control unit 32 further controls a sealer drive 34, by which part of the units 16 and 17 is driven to and fro according to the double arrows 22 and 22'. Details of this sealer drive 34 are shown in FIGS. 7 to 10.

Figure 2:
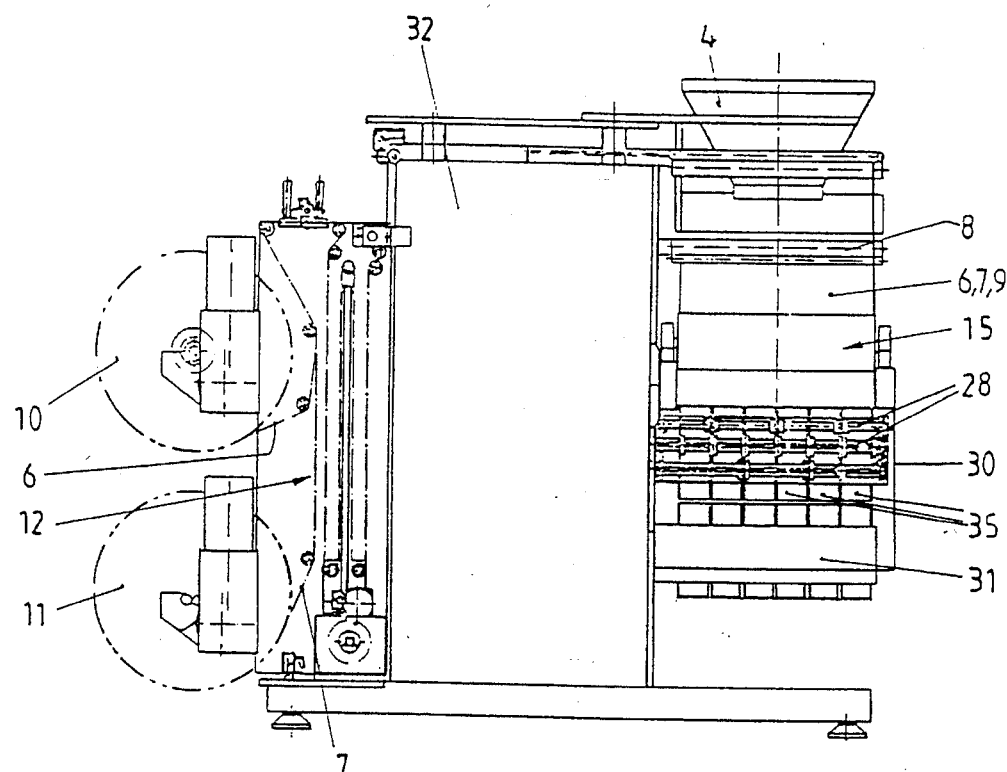
FIG. 2 a side view of the flat sack machine according to FIG. 1.

FIG. 2 shows a frontal view onto the foils 6 and 7 resp. the foil plane 9, which is identical to the plane of the drawing in this case. It can also be seen that the foils 6 and 7 are devided into six neighboring flat sacks 35, which are cut off in the transverse cutter 31, so that they can be further handled individually, e.g. packed into a box for transport purposes. FIG. 2 also shows the seals as they have been made by the longitudinal sealing tools 25 and the transverse sealing tools 26.

Figure 3:
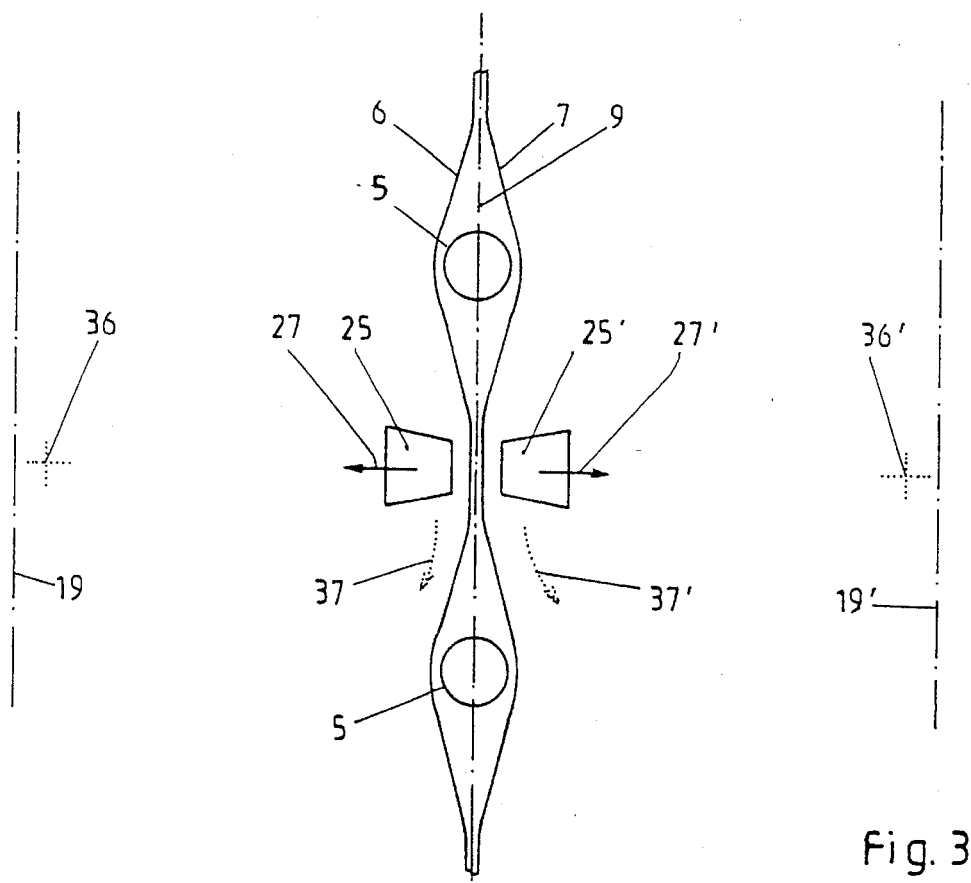
FIG. 3 a horizontal cut through the vertical plane of the foil with the filling means, FIG. 4 a vertical cut through some parts of the unit, FIG. 5 a schematic side view of the pivot drive, FIG. 6 a schematic top view of the pivot drive according to FIG. 5, FIG. 7 a horizontal cut through the pivot spars according to a horizontal plane connecting the axes of the pivot spars, FIG. 8 a vertical cut through a pivot spar with the sealer spar support arranged thereon, FIG. 9 a top view of the part of the sealer drive housed inside the sealer spar support, and FIG. 10 a corresponding cut front view in the region of the pivot spar with the sealer spar support arranged thereon.

FIG. 3 shows in a horizontal cut a partial depiction examplifying the invention. The arrangement according to the invention is shown in a solid line with dash-dotted pivot axes 19 and 19'. The dotted line depicts for comparison the arrangement according to the state of the art. It can be seen that the filling means 5 shown as tubes are situated symmetric to the foil plane 9, and extend in between the foils 6 and 7 down to the sealer 15, as already shown in FIG. 1. For reasons of clarity only the longitudinal sealing tools 25, 25' are shown. In the state of the art the longitudinal sealing tools 25, 25' (as well as further parts of the comparable units 16 and 17) were pivotable about vertical pivot axes 36 and 36', so that the longitudinal sealing tools 25, 25' moved along the corresponding dotted arrows 37, 37'. This posed the danger that the longitudinal sealing tools 25 and 25' came into contact with the filling means 5, damaged them and changed their position, so that they no longer were position along the center axis of a flat sack 35. This was a very annoying side effect, which necessitated elaborate setup work. In the new arrangement the longitudinal sealing tools 25 and 25' pivot abut the pivot axes 19 and 19', and therefore distance themselves according to the arrows 27 and 27' already at the start of the pivoting away from the foil plane 9, so that there is no more danger that the longitudinal sealing tools 25, 25' come into contact with the filling means 5. If it is further taken into consideration that the opening pivoting movement about the pivot axes 19 and 19' is started especially from the separated position according to FIG. 1, right side, then it becomes fully understandable that the opening pivoting movement occurs without the drawbacks known from the state of the art. From FIG. 3 it also becomes clear—even though not shown in the Figure—that the transverse sealing tools 26, which are usually arranged below the filling means 5, also move away from the foil plane 9 already at the beginning of the pivoting.

Figure 4:
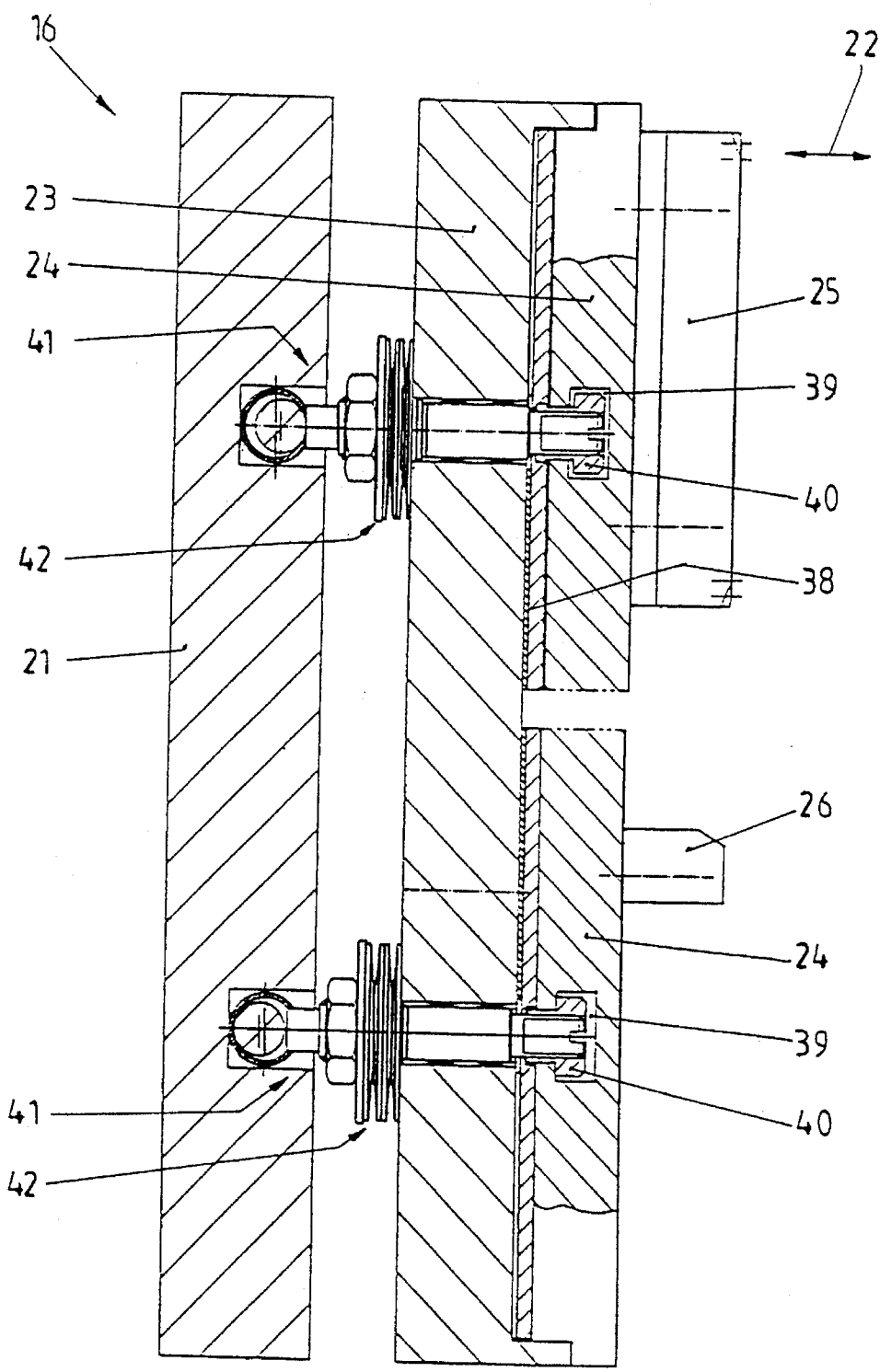
Figure 7:
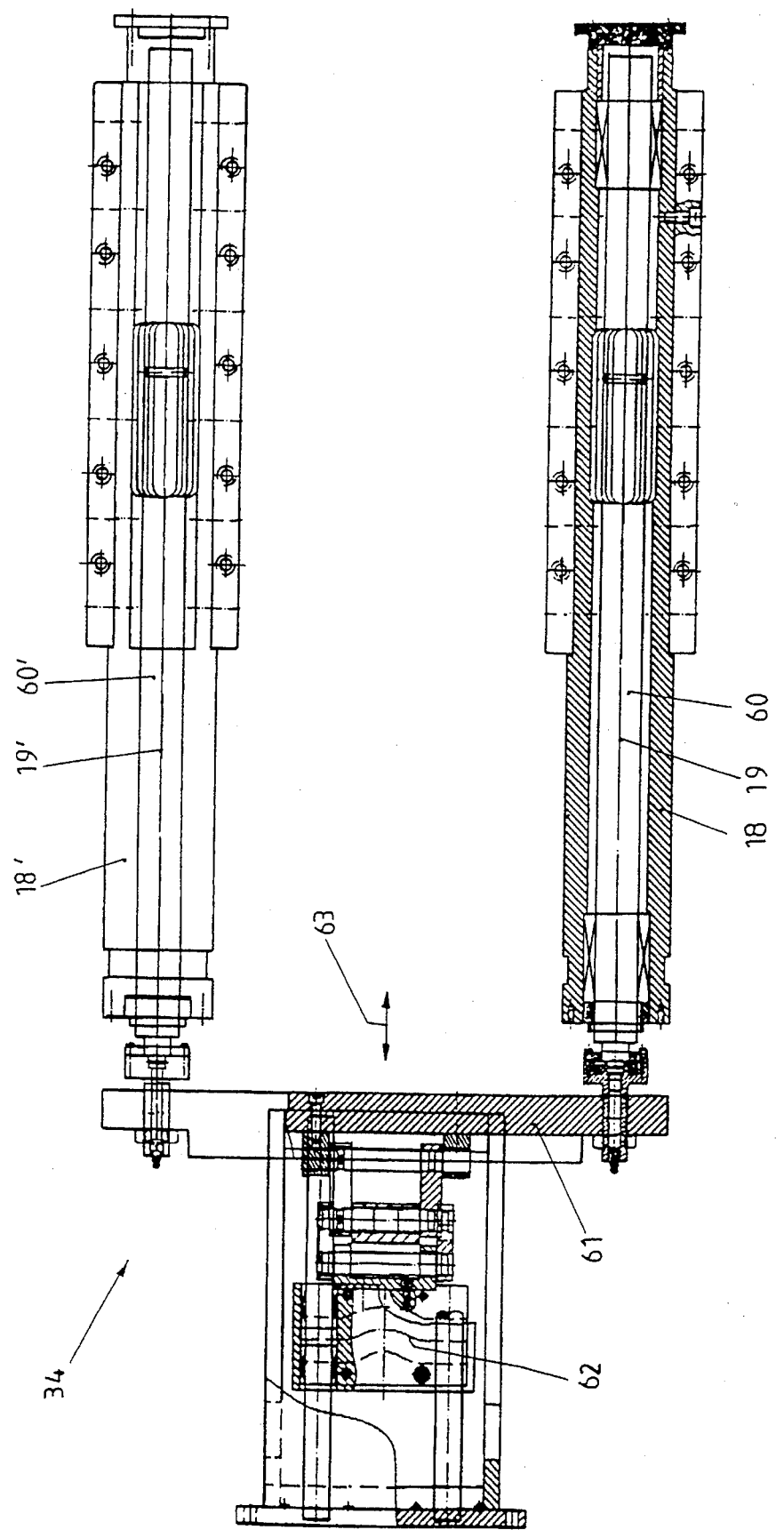
Figure 8:
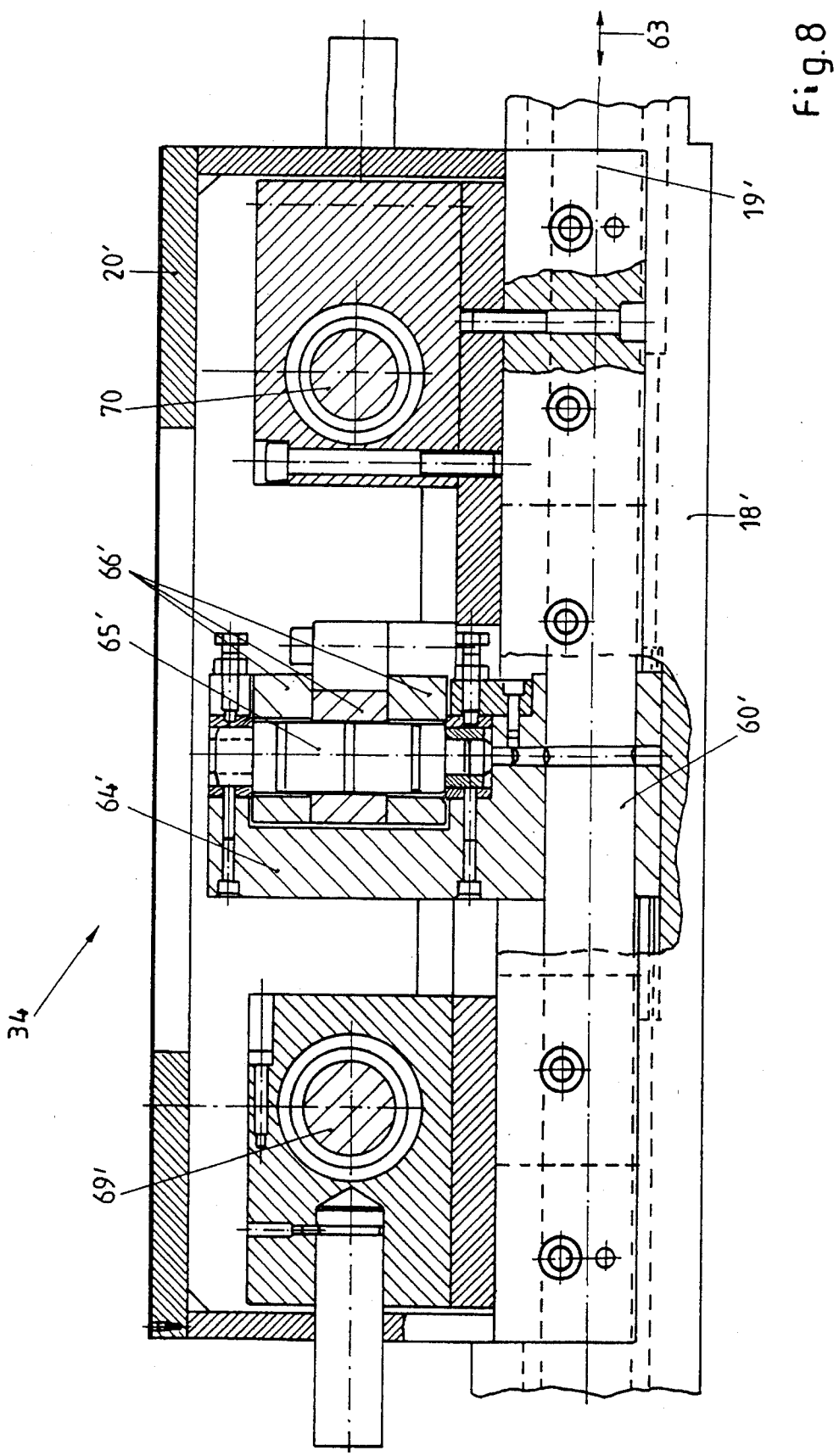
Figure 9:
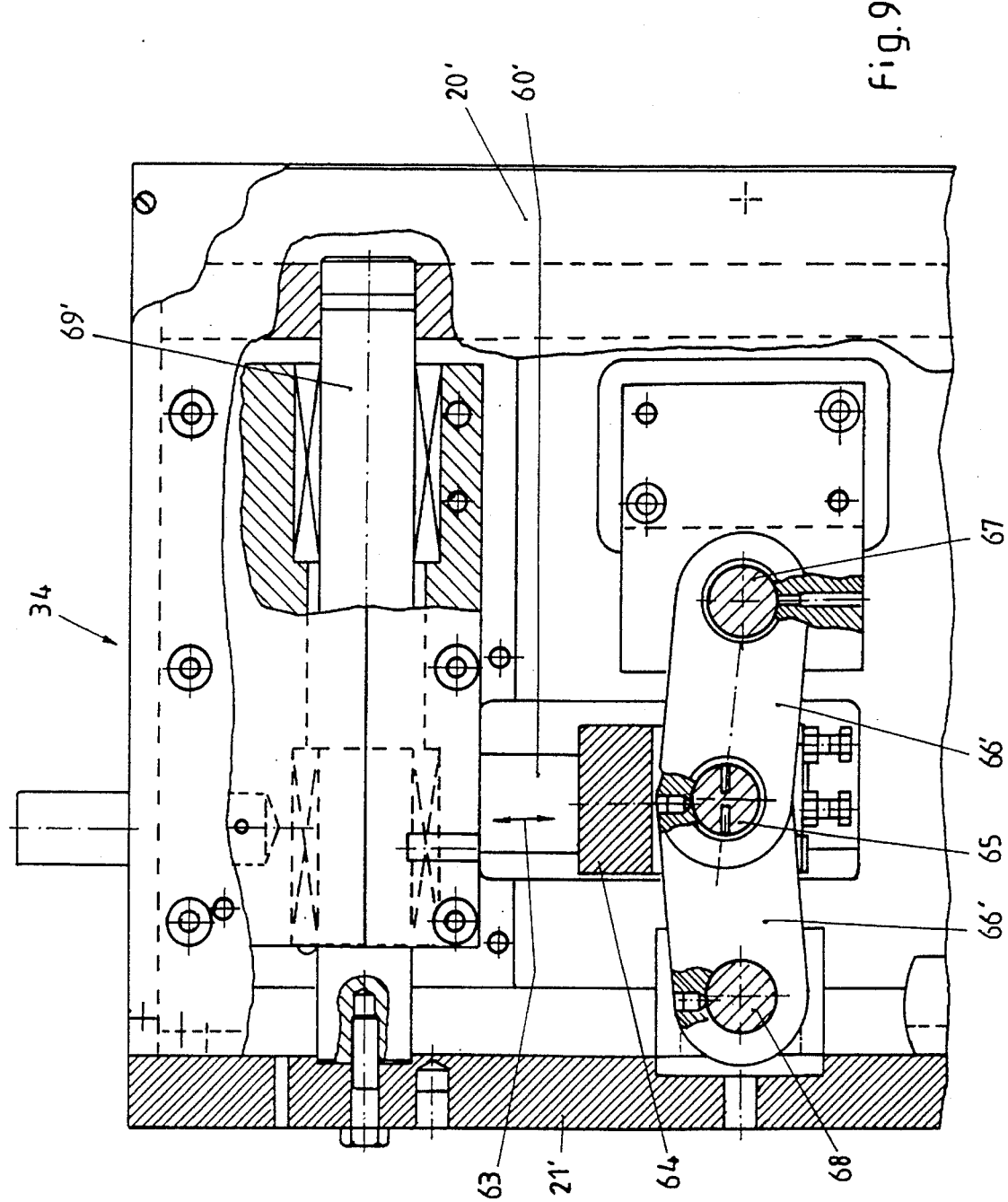
Figure 10:
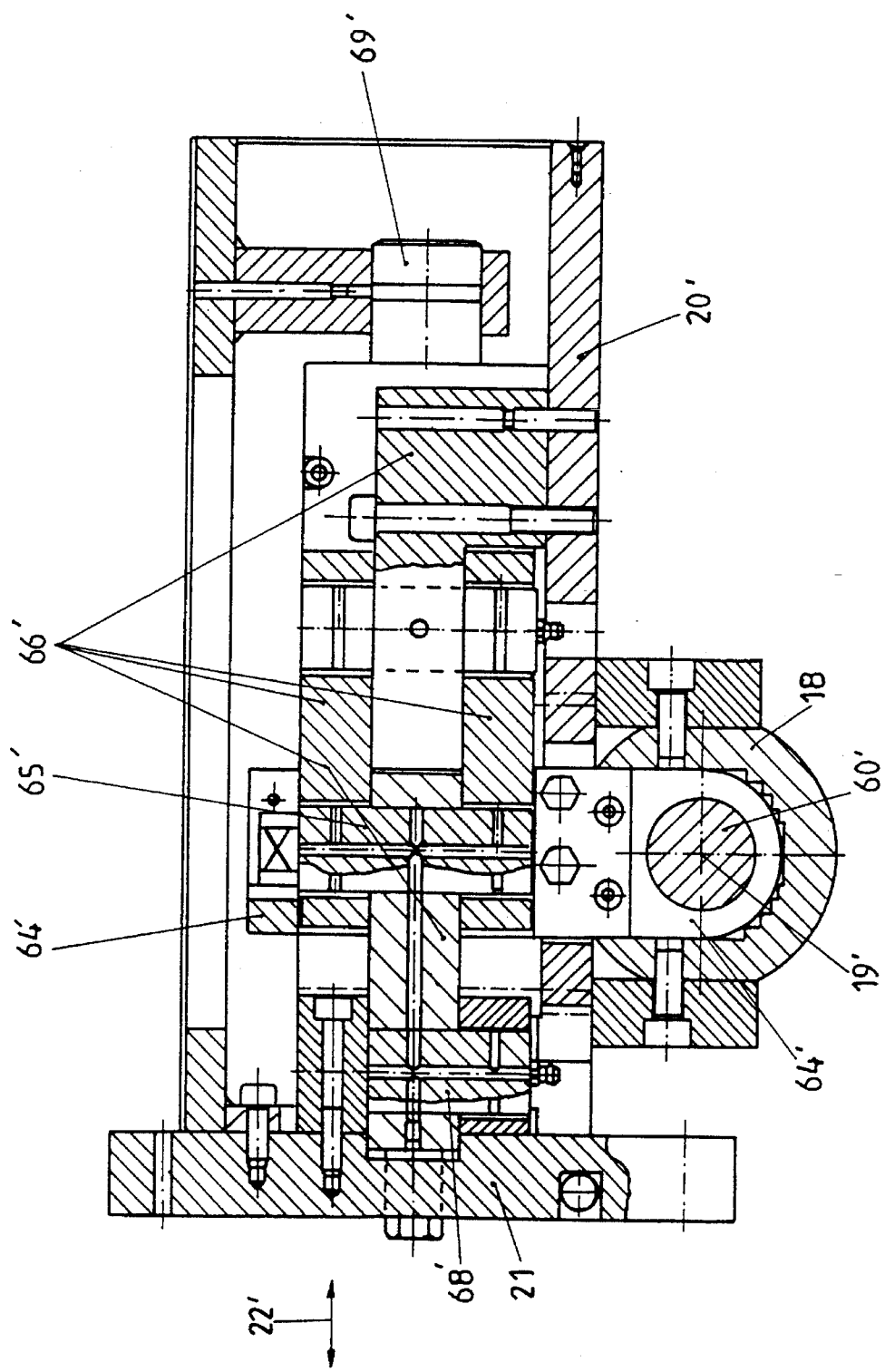

FIG. 4 depicts the arrangement of those parts of the unit 16, which are not only pivotable about the pivot axis 19 according to the arrow 27, but are also actuated by the sealer drive 34 according to the arrow 22. The heating plate 23, which is provided with an electrical heating foil 38, is arranged on the sealer spar 21. The temperature is also controlled by the control unit 32. The clamping plate 24, which may also be fashioned from a number or parts, has T-shaped continuous grooves 39, into which grip heads 40 of clamping devices 41 engage. The clamping devices 41 may be fashioned as eccentric spanners and may be borne in the sealer spar 21. The upper clamping device 41 is shown in the relaxed state, in which the upper clamping plate 24 with the longitudinal sealing tools 25 arranged theron is freely movable along the direction of the groove 39. The lower clamping device 41 shows the tightened state, in which the lower clamping plate 24 with the transverse sealing tools 26 is tightened against the heating plate 23. It is understood that the change of tools indicated in this way is performed by a changing of the clamping plate 24 and the longitudinal sealing tools 25 or transverse sealing tools 26 arranged thereon in the fitting and cleaning position, as indicated in the right half of FIG. 1. Wherein the clamping plates 24 are then in a horizontal position, so that they are supported and carried by the heating plate 23. The clamping plate only have to be slid into their correct relative position and tightened with the aid of the clamping device 41. During this tightening the clamping plate 24 is also pressed onto the heating plate 23, so that a good thermal contact is obtained. This is achieved by disk springs 42 that can be regulated in tension.

The FIGS. 5 and 6 show the motor drive 33 for pivoting the units 16 and 17 about their pivot axes 19 and 19'. The motor drive 33 has a gear motor 43, by which a gear 45, which is fixed on a shaft 46, is driven via a chain 44. On the shaft 46 there is a further gear 47, which drives a gear 50, which is connected to the pivot spar 18' fixed about the pivot axis 19', via a chain 48 and a tension roller 49. A shaft 51 is provided, to which a gear 52 is fixed, which drives a gear 54 via a chain 53, said gear 54 being fixed to the pivot spar 18 of the unit 16. Furthermore, a gear 55 is fixed to the shaft 46 and a gear 56 to the shaft 51, which constantly mesh, and by which the motor drive 33 is transmitted to the unit 16 and which ensures that the units 16 and 17 always pivot simultaneously and in opposite senses of direction, as shown by the arrows 27 and 27'. An actuating rod 57, to which feelers 58 and 59 especially fashioned as limit switches are assigned, is connected to the pivot spar 18. The actuating rod 57 is in contact with the feelers 58 when the flat sack machine 1 is in the operating state, in which the sealer lift according to the arrows 22 and 22' is performed. The actuating rod 57 contacts the feelers 59, though, when the two units 16 and 17 are in the fitting and cleaning position.

The main parts of the sealer drive 34 are shown in FIGS. 7 to 10. The important thing is that the sealer drive 34 is guided through the pivot spars 18, 18'. The pivot spars 18 and 18' are fashioned to be hollow. A thrust rod 60 is borne moving to and fro in the pivot spar 18 in the direction of the pivot axis 19 with the aid of needle bearings indicated in FIG. 7. A thrust rod 60' is arranged correspondingly in the pivot spar 18'. The two thrust rods 60 and 60' are connected by a bridge 61. The drive of a crank pin not shown is translated to a to and fro moving drive for the bridge 61 and the thrust rods 60 and 60' via a slide track 62, as it is necessary in the corresponding ratio for the sealer lift. The to and fro moving drive of the thrust rods 60 and 60' is performed according to the double arrow 63, i.e. parallel to the pivot axes 19 and 19'. In the FIGS. 8 to 10 only the parts of the unit 17, i.e. with the primed reference numerals, are shown. It is understood that the unit 16 is built in a corresponding symmetric fashion. It can be seen from FIG. 8 that connected to the thrust rod 60' in the pivot spar 18' there is a fork block 64', which therefore also moves to and fro according to the double arrow 63 and transfers this movement via a pin 65' to a knee lever drive 66', which is arranged on the inside of the sealer spar support 20'. The knee lever drive 66' has a fixed bearing 67' in the sealer spar support 20', while the free end of the other knee lever is connected to the sealer spar 21' via a pin 68'. The sealer spar 21' is guided parallel to the sealer spar support 20' by two guide rods 69' and 70', so that it may perform the sealer lift according to the double arrow 22' and guide the sealer spar 21 always perpendicular to its plane of extension. As it is seen, this cleverly translates a to and fro movement in the direction of the pivot axis 19' according to the double arrow 63 via a knee lever drive 66' into a movement of the sealer lift perpendicular thereto according to the arrow 22'. The corresponding same holds for the unit 16. Here, too, a to and fro drive of the thrust rod 60 in the pivot spar 18 in the direction of the pivot axis 19 is translated into the sealer lift according to the double arrow 22.

While the foregoing specification and drawing described a preferred embodiment of the invention, it will be understood by those skilled in the art that variations and modifications thereof can be made without departing from the spirit and scope of the invention, as set forth in the following claims.

LIST OF REFERENCE NUMERALS

1—flat sack machine
2—machine frame
3—measurer
4—reservoir
5—filling means
6—foil
7—foil
8—deflector
9—foil plane
10—roller
11—roller
12—foil storer
13—arrow
14—arrow
15—sealer
16—unit
17—unit
18—pivot spar
19—pivot axis
20—sealer spar support
21—sealer spar
22—double arrow
23—heating plate
24—clamping plate
25—longitudinal sealing tools
26—transverse sealing tools
27—arrow
28—signing station
29—discharge device
30—longitudinal cutter
31—transverse cutter
32—control unit
33—motor drive
34—sealer drive
35—flat sack
36—pivot axis
37—arrow
38—heating foil
39—groove
40—grip head
41—clamping device
42—disk spring
43—gear motor
44—chain
45—gear
46—shaft
47—gear
48—chain
49—tension roller
50—gear
51—shaft
52—gear
53—chain
54—gear
55—gear
56—gear
57—actuating rod
58—feeler
59—feeler
60—thrust rod
61—bridge
62—slide track
63—double arrow
64—fork block
65—pin
66—knee lever drive
67—fixed bearing
68—pin
69—guide rod
70—guide rod

I claim:

1. Vertical cyclically working flat sack machine (1) for packaging flowable or pourable materials or objects in flat sacks formed from opposed foil sheets aligned in a common vertical foil plane comprising a machine frame, means for feeding the foil sheets into the machine, a measurer (3) with filling means (5) mounted to the machine frame for depositing flowable materials between the foils, a deflector (8) for guiding the foils into an opposed parallel relationship positioned on opposite sides of the measurer and filling means, a sealer (15) positioned below the filling means and adapted to engage and seal the foils together, a discharge device (29) downstream from the sealer, and longitudinal and transverse cutters positioned adjacent the discharge device, the sealer (15) including two symmetrically fashioned units (16, 17) positioned on opposite sides of the foil plane, each comprising a pivot spar (18, 18'), a sealer spar support (20, 20') mounted to each pivot spar, a sealer spar (21, 21') mounted to each pivot spar support, and, a heating plate (23, 23') and a clamping plate (24, 24') mounted on and supported by each sealer spar, with each clamping plate having elongated longitudinal and transverse sealing tools (25, 25', 26, 26') mounted thereupon, wherein the units (16, 17) each are movable horizontally toward and away from the foil plane to enable the units to be pivotable from a sealing position extending parallel to the foil plane (9) when the units are moved away from the foil plane, about a pivot axis (19, 19') approximately 90° with respect to the foil plane into a fitting and cleaning position, wherein the sealing tools and the clamping plates are positioned mainly above a horizontal plane connecting the pivot axes displaced from the foil plane and filling means to facilitate cleaning and replacement of the sealing tools.

2. Flat sack machine according to claim 1, wherein a motor drive (33) is-provided for pivoting the two units (16, 17) into and out of the fitting and cleaning position.

3. The flat sack machine according to claim 2, wherein the motor drive (33) includes a control unit (32), which triggers the motor to pivot the units into their fitting and cleaning positions during interruptions of the production process.

4. Flat sack machine according to claims 1, wherein also the transverse sealing tools (26, 26'.) are arranged on the clamping plate (24, 24') above the horizontal plane connecting the pivot axes (19, 19').

5. Flat sack machine according to claim 1, wherein upon reaching the position separated by the sealing lift, feelers (58, 59), especially limit switches, are provided, from the signals of which the control unit (32) initiates the pivoting into the fitting and cleaning position.

6. Flat sack machine according to claim 2 or 3, wherein the motor drive (33) for pivoting the units (16, 17) has a gear motor (43), two meshing gears (55, 56), and one geared connection to the pivot spar (18, 18') of each unit (16, 17).

7. Flat sack machine according to claim 1, wherein the pivot spar (18, 18') is formed to be hollow and the sealer drive (34) for the sealer spar (21, 21') is led through the pivot spar (18, 18') of each unit (16, 17).

8. Flat sack machine according to claim 1, wherein each unit (16, 17) is provided with a clamping device (41) for quickly changing the clamping plate (24, 24') with the sealing tools (25, 26, 25', 26') arranged thereupon.

9. A flat sack machine for packaging flowable materials in flat sacks formed from opposed foil sheets, comprising:

a machine frame;

means for feeding the foil sheets downwardly in an opposed relationship along a common foil plane;

filling means mounted to said machine frame and positioned in said foil plane for depositing flowable materials between the foil sheets; and a sealer positioned downstream from said filling means and including a pair of units positioned parallel to and on opposite sides of said foil plane, said units each comprising a clamping plate mounted to a pivot spar that supports and enables each clamping plate to pivot about a horizontal axis, with said clamping plates each having a series of longitudinal and transverse sealing tools mounted thereto for engaging and sealing the foil sheets together to form a series of flat sacks;

whereby said units are movable from a sealing position with their clamping plates positioned adjacent and extending parallel to said foil plane for engaging and sealing the foil sheets, to a fitting and cleaning position displaced from said foil plane and wherein said clamping plates of said units are positioned in a horizontal alignment above a horizontal plane connecting said pivot axes of said units to facilitate the cleaning and replacement of said longitudinal and transverse sealing tools.

10. The flat sack machine of claim 9 and further including a motor and a control means for said motor for pivoting said units from their sealing positions to their filling and cleaning positions in response to interruptions in the packaging process.

11. The flat sack machine of claim 9 and further including cutters positioned downstream from said sealer for separating the sacks formed by the sealed foil sheets.

12. The flat sack machine of claim 11 and wherein said cutters include longitudinal and transverse cutters.

* * * * *